Aug. 26, 1952 — L. G. KRUG — 2,608,425
SEAL
Filed Sept. 27, 1946 — 2 SHEETS—SHEET 1
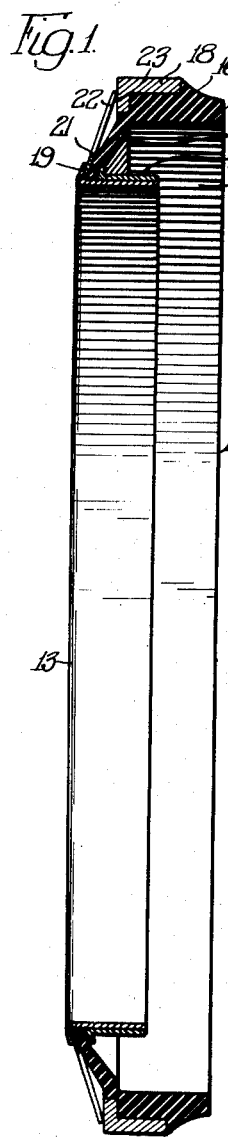
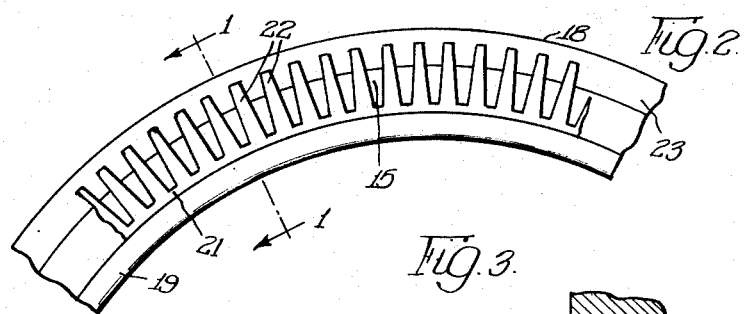
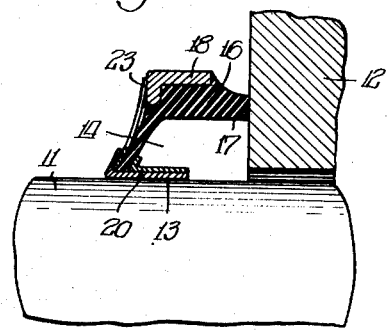
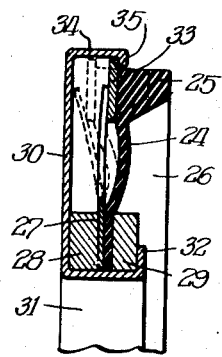
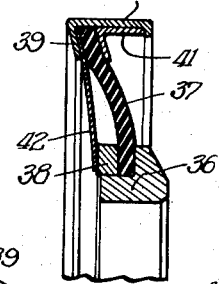
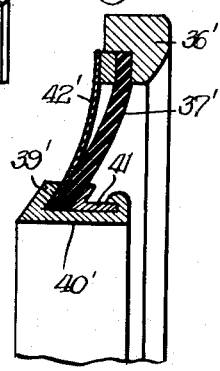
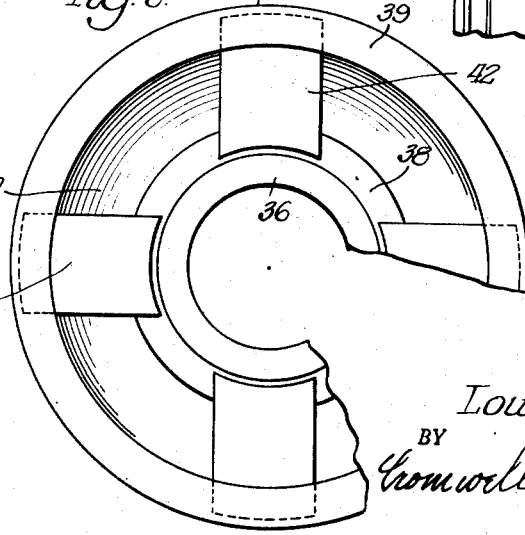
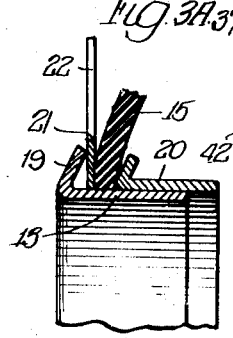
INVENTOR.
Louis G. Krug,
BY Cromwell, Greist & Warden
attys.

Aug. 26, 1952 — L. G. KRUG — 2,608,425
SEAL
Filed Sept. 27, 1946 — 2 SHEETS—SHEET 2
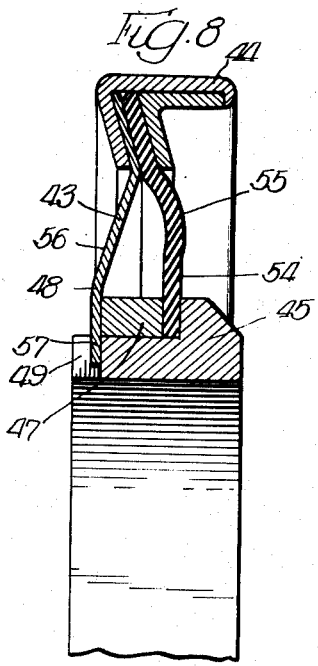
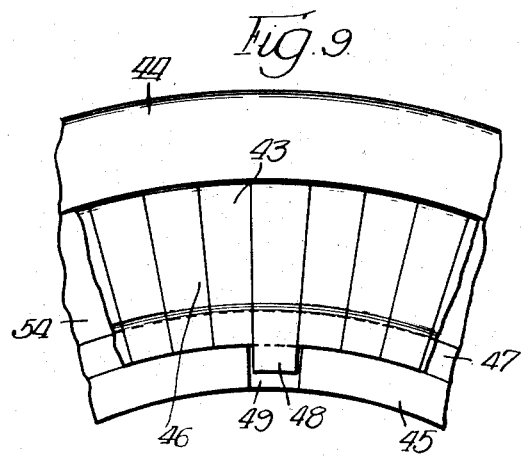
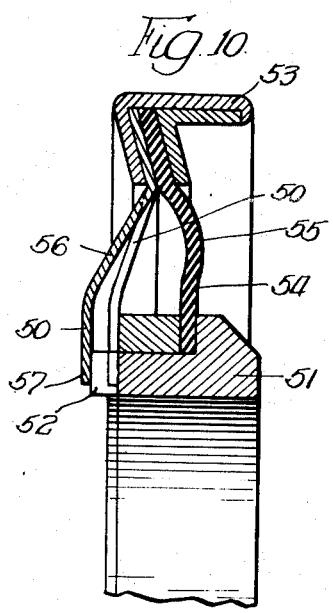
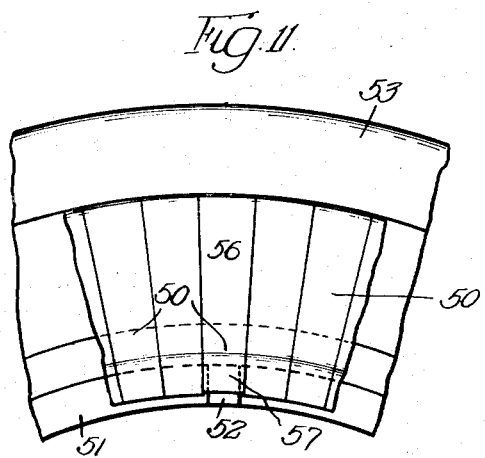
INVENTOR.
Louis G. Krug,
BY Cromwell, Greist & Warden
Attys.

Patented Aug. 26, 1952

2,608,425

UNITED STATES PATENT OFFICE 2,608,425

SEAL

Louis G. Krug, Evanston, Ill., assignor to Chicago Rawhide Manufacturing Company, Chicago, Ill., a corporation of Illinois Application September 27, 1946, Serial No. 699,785

2 Claims. (Cl. 288—3)

The present invention pertains to improvements in a shaft seal of the radial diaphragm type adapted to be associated in a well known manner with a pair of relatively rotatable parts, such as a shaft and housing, to prevent fluid leakage therebetween or passage of dirt or other impurities.

It is an object of the invention to provide a simple and inexpensive, readily and quickly assembled seal which is very responsive in operation and minimizes frictional loss and wear.

More particularly, an object of the invention is to provide a seal embodying a radial diaphragm of flexible material having an annular sealing element integral therewith, in association with an annular thrust-transmitting finger spring, said diaphragm having a pressure ring integrally bonded thereto which is engaged by said spring in a manner to transmit and maintain sealing thrust on said element, with satisfactory unit pressure and without excessive end force.

Various embodiments of the invention are presented herein for purpose of exemplification, but it will be appreciated that the invention may be produced in other modified forms coming equally within the scope of the appended claims.

In the drawings,

Fig. 1 is an enlarged view in vertical longitudinal section, illustrating the improved seal of this invention in accordance with one embodiment thereof;

Fig. 2 is a fragmentary view in rear elevation, viewed from the left of Fig. 1, further illustrating details of the combination;

Fig. 3 is a fragmentary view, in section generally similar to Fig. 1, illustrating the seal as operatively applied to relatively rotatable shaft and housing members or the like;

Fig. 3A is an enlarged fragmentary view illustrating the manner of assembling the diaphragm and finger spring to the housing member of the ring whereby to impart a dished outline to the spring;

Fig. 4 is an enlarged fragmentary view in longitudinal vertical section illustrating an alternative form of seal, showing, in solid lines, the position of the parts in a relaxed condition and, in dotted lines, the position of the parts under operating conditions;

Fig. 5 is a fragmentary view generally similar to Fig. 4, illustrating a further modified embodiment of the seal;

Fig. 6 is a fragmentary view in rear elevation, viewed from the left of Fig. 5, further illustrating structural features of that seal;

Fig. 7 is a fragmentary view similar to Fig. 5, illustrating a still further embodiment of the seal incorporating features similar to those shown in Fig. 5;

Fig. 8 is an enlarged fragmentary view in longitudinal axial section illustrating a further modified form of the invention wherein the force transmitting spring additionally serves to lock and transmit torque between the housing and sealing members of the seal;

Fig. 9 is a fragmentary rear elevational view of the seal illustrated in Fig. 8;

Fig. 10 is a view similar to Fig. 8, illustrating a slightly modified embodiment of the seal having provision for attaining the purposes noted in connection with that figure; and Fig. 11 is a fragmentary rear elevational view of the seal shown in Fig. 10.

Referring to the drawings, the reference numeral 10 generally designates a shaft seal in accordance with one embodiment of my invention, adapted to be associated on a shaft 11 or like part for engagement with a housing 12 or another similar relatively rotatable part, in the well known manner illustrated in Fig. 3. The seal is of extremely simple and inexpensive construction, comprising a sheet metal mounting member or sleeve 13 which may be force fitted on the shaft, said mounting member serving to fixedly engage and support a flexible sealing member which is generally designated by the reference numeral 14.

Member 14 incorporates an annular, generally radial diaphragm 15 of flexible material such as rubber, synthetic rubber, a suitably treated fabric or any other flexible material or composition suited to the purposes and requirements of the seal. The radial dimension of diaphragm 15 may be varied in accordance with the needs of the installation. Adjacent its outer periphery diaphragm 15 is provided with an enlarged, forwardly projecting sealing element or nose piece 16, generally in the form of a cylindrical sleeve extending coaxial with the mounting sleeve 13, in radially outwardly spaced relation thereto. Element 16 has a face sealing surface 17 of relatively small radial width, for engagement with the housing 12 under relatively high unit pressure for a comparatively slight axial force. The sealing element 16 is peripherally rabbeted at its rear outer edge for the reception of an annular confining and pressure-transmitting ring 18 of angled, L-shaped cross-sectional outline. This pressure ring is preferably integrally bonded adhesively to the sealing element as by vulcanization and affords a rear annular bearing surface 23 for the application of axial sealing pressure to the element 16, in the manner described.

The inner periphery of diaphragm 15 is fixedly clamped between a radially outwardly spun, annular flange 19 on the mounting sleeve 13 and a separate similarly conformed clamping member 20. Member 20 preferably is telescoped over sleeve 13 with a force fit and serves to hold the diaphragm in fixed relation to the mounting member or sleeve 13.

The clamping member 20 also serves to clamp an annular finger spring 21 in fixed relation to the mounting member 13. Spring 21 is of a well-known type, having an inner diameter equal to that of the diaphragm and is disposed and clamped rearwardly of said diaphragm, between the same and the flange 19. Said spring is of generally conical outline, provided with a multiplicity of radially outwardly directed, spaced flexible fingers 22. These fingers bear against the rear bearing surface of the pressure ring 18 so that when the seal is installed in the manner illustrated in Fig. 3, the spring fingers 22 are flexed rearwardly to apply axial force on the pressure ring 18. In flexing during the normal operation of the seal, the fingers slide freely on the rear bearing surface 23 of the pressure ring to maintain engagement of the seal with a coactive surface under desired pressure. Moreover, ring 18 radially confines the sealing element 16, reinforcing the same in this direction, in addition to maintaining the sealing face 17 of said element in a radial plane at all times as the element 16 shifts axially in operation.

In initial condition the annular finger spring 21 has a flat planar character, the conical or dished outline thereof being imparted to the spring in assembly, in the manner illustrated in Fig. 3A. The spring is telescoped on the inner mounting sleeve 13 against the flange 19 of the latter. Diaphragm 15 is then placed over said sleeve, and it is desirable in some cases that the inner diameter of the diaphragm be slightly smaller than the outer diameter of the sleeve. This causes the diaphragm surface which engages the sleeve to be stressed in the radial direction and provides a certain amount of axial "belly" in the radial portion of the diaphragm, thereby enabling the latter to shift axially without tilting or canting to such an extent as to detract from proper sealing engagement with the coacting surface. The other clamping member 20 is then telescoped over sleeve 13, jamming the finger spring 21 into surface engagement with the flange 19, thereby dishing the spring and clamping the parts securely in operative relation.

In the form illustrated, the angularity of the flanges of the clamping rings is important for the reason described in the preceding paragraph. The conical dished finger spring enables point contact of the fingers 22 against the rear of the bearing surface 23, as illustrated in Fig. 1.

A somewhat modified embodiment of the invention is illustrated in Fig. 4, characterized by a similar integral construction of a diaphragm 24 and the annular sealing element 25 of a sealing member generally indicated 26. The latter is fixedly clamped, along with a finger spring 27 similar to spring 21, between a pair of clamp rings 28, 29. These are locked between the radial rear wall 30 of the annular mounting member 31 and a forward, outwardly spun annular flange on the latter. In this case the finger spring 27 is wholly radial in its disposition and bears against a radial pressure ring 33 adhesively bonded flush against the rear surface of sealing element 25. The diaphragm 24 is axially bellied as in the first embodiment.

It will be noted that pressure ring overlaps the outer periphery of element 25. Mounting member 31 is conformed in the shape of a partially closed annular housing to enclose the spring and pressure ring, having an outer axial wall portion 34 terminating in an inwardly spun lip 35. This lip is engageable in the manner of a stop by the overlapping portion of the pressure ring 33, to thereby limit the axial movement of the sealing element. Positions of the parts in relaxed condition and under operative sealing condition are respectively illustrated in Fig. 4 in solid and in dotted lines. This form contains the primary advantages of that shown in Figs. 1 to 3 inclusive, and in addition the stop feature just referred to. In both embodiments described, the seal may be applied in other relationships than the specific example shown, as regards its attachment to one or the other of a pair of relatively rotatable parts, the character of the running seal which it effects, and the like.

In Figs. 5 and 6, a further form of the invention is shown, which employs a separate sealing element or nose piece 36 in lieu of the integral conformation on the diaphragm described above. In this embodiment the nose piece is rearwardly and externally relieved for the reception of the inner periphery of the diaphragm 37, and the latter is clamped in the resulting recess by an annular clamping and pressure ring 38. The external periphery of the diaphragm is clamped between an annular in-turned flange 39 on the mounting member 40 and an angled clamping element 41. As in the preceding forms, the diaphragm periphery differs from that of the mounting member to produce the axial "belly." A plurality of leaf spring members 42 are clamped rearwardly of diaphragm 37 between the same and flange 39, these springs engaging a rear bearing surface on the referred to ring 38.

In Fig. 7 a very similar form is illustrated, the parts merely being reversed for mounting of the seal on a central shaft, as distinguished from the embodiment of Fig. 5 which is designed to be fixedly secured to a housing or the like. Accordingly, the same reference numerals, primed, have been utilized.

In Figs. 8 and 9 I illustrate the provisions of the invention adapted in a ring wherein the finger spring, designated 43, is employed to rotatively lock and absorb torque between the mounting member, generally designated 44, and the sealing member, generally designated 45. In this form the majority of the spring fingers 46 engage rearwardly of the diaphragm clamping ring 47 to urge the sealing member 45 axially. However, one or more of the spring fingers particularly designated 48 is of greater length so as to radially overlie the rear portion of the sealing member 45, which has a notch or slot 49 milled therein to receive said finger. Accordingly, finger or fingers 48 serve to absorb torque between members 44, 45, in addition to exerting axial thrust.

In the ring of Figs. 10 and 11 the same objective is attained in a slightly different way. In this form all of the spring fingers 50 are of equal length and bear against the rear portion of the body of sealing member 51. Said sealing member carries one or more rearwardly projecting locking lugs 52 adapted to be positioned in alignment with one or more of the fingers 50 to constitute a driving connection between the sealing member 51 and the other fingers, serving to couple the mounting member 53 to the sealing member and absorb torque therebetween.

Either of the above two forms has the advantage that the function of absorbing or transmitting torque is removed from the diaphragm, designated 54 in each case, and imposed on the comparatively rigid finger spring, without loss of the latter's function of transmitting axial force.

It will be observed that Figs. 8 and 10 illustrate clearly the principle of stretching the diaphragm radially somewhat in the mounting thereof, whereby to impart a "belly" to the diaphragm at 55, as mentioned previously. This enables free axial floating movement of the sealing members 45, 51, without such tilting or canting as would interrupt a full sealing engagement with a co-acting surface.

It will also be noted that in the forms of Figs. 8 through 11 the spring fingers have a rearwardly angled conformation at 56, terminating in a radial extremity 57 to enable unfailing location and retention thereof relative to the slot or slots 49 and the lug or lugs 52.

The principles of the invention are believed to be clear from the illustration and description of the preceding forms. The seal is characterized by a very desirable simplicity and economy of parts, is easy to install, and maintains a desired unit pressure sealing engagement between two relatively rotatable parts without excessive axial force and resulting friction and wear. In all of the embodiments, the thrust ring in fixed relation to the nose piece on the rear side of the latter serves to maintain the forward sealing surface thereof in a true radial plane during the movements of the sealing element in operation. Performance of this function is further facilitated by the "bellying" of the intermediate diaphragm in the zone between the sealing element and the point of securement of the diaphragm on the mounting member therefor. The radially extending spring fingers of the peripherally clamped, annular spring slide freely on the rear surface of the aforesaid thrust ring. All of these features contribute to an improved trueness of sealing engagement and a lessening of frictional effects in securing the same.

What I claim is:

1. A seal comprising concentric annular mounting and sealing members, said sealing member including an annular, radial, flexible and resilient diaphragm of relatively soft, non-metallic material fixedly connected at its margins to said mounting member and sealing member, a thrust member fixedly secured to said diaphragm in radially spaced relation to said mounting member, and an annular finger spring carried by said mounting member and provided with radially projecting fingers in radially slidable engagement with said thrust member to exert axial sealing thrust on said sealing member, said diaphragm and mounting member having axially telescoped engagement and the telescoped periphery of said diaphragm normally radially overlapping the telescoped periphery of the mounting member, whereby the material of the diaphragm is in substantial radial compression when so telescoped and the diaphragm is radially bellied and relaxed between said members, said mounting member including a pair of separate, axially telescoped elements provided with similar radial extensions disposed at an acute angle to the axis of the seal and clamping said finger spring in an axially dished outline.

2. A seal comprising concentric annular mounting and sealing members, an annular, flexible diaphragm of relatively soft, non-metallic material extending radially between said members and connected respectively thereto, said diaphragm and mounting member having axially telescoped engagement and the telescoped periphery of said diaphragm normally radially overlapping the telescoped periphery of the mounting member, whereby the material of the diaphragm is in substantial radial compression when so telescoped and the diaphragm is bellied somewhat in the axial direction between said members, a relatively rigid thrust member of wear-resistant material adhesively bonded to said diaphragm in axial thrust-transmitting relation thereto, annular spring means on said mounting member provided with radially projecting spring fingers in radially slidable engagement with said thrust member to exert axial sealing thrust therethrough upon said sealing member, and means clamping said diaphragm and spring means to said mounting member, including a pair of elements on said mounting member having radial extensions inclined at an acute angle to the axis of said mounting member to clamp said spring means thereto in an axially dished sectional outline.

LOUIS G. KRUG.

REFERENCES CITED

The following references are of record in the file of this patent:

UNITED STATES PATENTS

| Number | Name | Date |
|---|---|---|
| 1,892,332 | Des Roches | Dec. 27, 1932 |
| 2,122,477 | Leonard | July 5, 1938 |
| 2,127,982 | Northrup et al. | Aug. 23, 1938 |
| 2,231,947 | Rich | Feb. 18, 1941 |
| 2,245,474 | Hately | June 10, 1941 |
| 2,251,012 | Delaval-Crow | July 29, 1941 |
| 2,275,307 | Murden | Mar. 3, 1942 |
| 2,289,274 | Krug | July 7, 1942 |
| 2,308,114 | Schjolin | Jan. 12, 1943 |
| 2,322,835 | Dornhofer | June 29, 1943 |
| 2,342,955 | Meyer | Feb. 29, 1944 |
| 2,375,085 | Curtis | May 1, 1945 |
| 2,377,452 | Reynolds | June 5, 1945 |
| 2,395,359 | Vedovell | Feb. 19, 1946 |
| 2,419,385 | Beier | Apr. 22, 1947 |
| 2,426,174 | Bottomley | Aug. 26, 1947 |
| 2,440,394 | Cockerill | Apr. 27, 1948 |
| 2,444,699 | Hastings et al. | July 6, 1948 |